(12) United States Patent
Johnston et al.

(10) Patent No.: US 11,976,682 B2
(45) Date of Patent: May 7, 2024

(54) BONDING WASHER

(71) Applicant: Hubbell Incorporated, Shelton, CT (US)

(72) Inventors: Devan E. Johnston, Nottingham, NH (US); Samuel Jackson Carbonneau, Goffstown, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 17/941,818

(22) Filed: Sep. 9, 2022

(65) Prior Publication Data
US 2023/0003248 A1 Jan. 5, 2023

Related U.S. Application Data

(63) Continuation of application No. 16/666,065, filed on Oct. 28, 2019, now Pat. No. 11,441,596.

(60) Provisional application No. 62/751,900, filed on Oct. 29, 2018.

(51) Int. Cl.
| | | |
|---|---|---|
| F16B 43/00 | (2006.01) | |
| F16B 39/24 | (2006.01) | |
| H01R 4/64 | (2006.01) | |

(52) U.S. Cl.
CPC .............. *F16B 43/00* (2013.01); *F16B 39/24* (2013.01); *H01R 4/64* (2013.01); *F16B 2200/93* (2023.08)

(58) Field of Classification Search
CPC ...................... F16B 39/24; F16B 43/00; F16B 43/001–002; F16B 43/006; F16B 2200/93; H01R 4/64
USPC ................. 411/337, 531, 534, 540, 542, 547
See application file for complete search history.

(56) References Cited

U.S. PATENT DOCUMENTS

| | | | |
|---|---|---|---|
| 325,235 | A | 9/1885 | Buimer |
| 329,615 | A | 11/1885 | Andrews |
| 334,031 | A | 1/1886 | Morse |
| 878,476 | A | 2/1908 | Barker |
| 1,183,174 | A | 2/1908 | Dice |
| 1,489,835 | A | 4/1924 | Kietz |
| 1,724,595 | A | 8/1929 | Hyle |
| 1,878,199 | A | 9/1932 | Stenger |
| 1,916,526 | A | 7/1933 | Olson |
| 2,034,258 | A | 3/1936 | Hausser |

(Continued)

FOREIGN PATENT DOCUMENTS

| | | |
|---|---|---|
| EP | 1703594 | 9/2006 |
| FR | 769005 | 8/1934 |

(Continued)

OTHER PUBLICATIONS

International Search Report and Written Opinion dated Jan. 14, 2020 in corresponding PCT/US2019/58365, 9 pgs.

(Continued)

*Primary Examiner* — Roberta S Delisle
(74) *Attorney, Agent, or Firm* — Wissing Miller LLP

(57) ABSTRACT

The present disclosure provides descriptions of configurations for bonding washers used to facilitate the electrical bonding of metal structures. The bonding washer includes an electrically conductive body and at least one piercing member extending from a bottom surface of the body. An extended member extends from the electrically conductive body in a direction away from the bottom surface of the body.

21 Claims, 16 Drawing Sheets

(56) References Cited

U.S. PATENT DOCUMENTS

| | | | |
|---|---|---|---|
| 2,034,494 A | 3/1936 | Stoll | |
| 2,069,402 A | 2/1937 | Cowlin | |
| 2,084,109 A | 6/1937 | Ribble | |
| 2,149,359 A | 3/1939 | Olson | |
| 2,179,575 A | 11/1939 | Hosking | |
| 2,250,280 A | 7/1941 | Starbird | |
| 2,271,732 A | 2/1942 | Chappuis | |
| 2,561,679 A | 7/1951 | Waller | |
| 2,796,457 A | 6/1957 | Stinger | |
| 2,934,684 A | 4/1960 | Fegan | |
| 3,138,658 A * | 6/1964 | Weimer, Jr. | H01R 12/69 439/421 |
| 3,175,462 A | 3/1965 | Disley | |
| 3,247,316 A | 4/1966 | Weimder, Jr. | |
| 3,285,313 A | 11/1966 | Blakesley | |
| 3,315,720 A | 4/1967 | Gutshall | |
| 3,340,494 A * | 9/1967 | Gutshall | H01R 11/12 411/149 |
| 3,388,369 A | 6/1968 | Zalmans | |
| 3,481,381 A | 12/1969 | Black | |
| 3,504,101 A | 3/1970 | Muto | |
| 3,509,517 A | 4/1970 | Gutshall | |
| 3,541,226 A | 11/1970 | Cea et al. | |
| 3,541,227 A | 11/1970 | Bendrick | |
| 3,626,357 A | 12/1971 | Kindell | |
| 3,686,609 A | 8/1972 | Hansen | |
| 3,719,919 A | 3/1973 | Tibolla | |
| RE27,743 E | 8/1973 | Weimer, Jr. | |
| 3,753,204 A | 8/1973 | Thompson et al. | |
| 3,761,867 A | 9/1973 | Churla | |
| 3,937,403 A | 2/1976 | Lawson | |
| 3,945,704 A | 3/1976 | Kraus et al. | |
| 4,022,262 A | 5/1977 | Gunn | |
| 4,023,882 A | 5/1977 | Pettersson | |
| 4,060,301 A | 11/1977 | Beatty | |
| 4,256,359 A | 3/1981 | Storck | |
| 4,263,474 A | 4/1981 | Tennant | |
| 4,406,505 A | 9/1983 | Avramovich | |
| 4,473,714 A | 9/1984 | Brownell et al. | |
| 4,498,715 A | 2/1985 | Peppler | |
| 4,560,224 A | 12/1985 | Weisenburger | |
| 4,659,870 A | 4/1987 | Jones | |
| 4,669,803 A | 6/1987 | Kim | |
| 4,704,058 A | 11/1987 | Crunwell | |
| 4,859,205 A | 8/1989 | Fritz | |
| 4,900,209 A | 2/1990 | Reynolds | |
| 4,961,712 A | 10/1990 | Schwenk et al. | |
| 5,078,613 A | 1/1992 | Salmon | |
| 5,100,506 A | 3/1992 | Sturtevant et al. | |
| 5,207,588 A | 5/1993 | Ladouceur et al. | |
| 5,236,272 A | 8/1993 | Hibbard | |
| 5,338,233 A | 8/1994 | Endo | |
| 5,399,096 A | 3/1995 | Quillet et al. | |
| 5,435,746 A | 7/1995 | Leeb | |
| 5,441,417 A | 8/1995 | Ladouceur et al. | |
| 5,453,027 A | 9/1995 | Buell et al. | |
| 5,487,685 A | 1/1996 | Stilliback | |
| 5,489,180 A | 2/1996 | Ichihara et al. | |
| 5,501,008 A | 3/1996 | Leeb | |
| 5,620,290 A | 4/1997 | Homfeldt et al. | |
| 5,644,830 A | 7/1997 | Ladouceur et al. | |
| 5,681,191 A | 10/1997 | Robicheau | |
| 5,828,008 A | 10/1998 | Lockwood et al. | |
| 6,106,310 A | 8/2000 | Davis | |
| 6,129,492 A | 10/2000 | Uno | |
| 6,224,288 B1 | 5/2001 | Postma et al. | |
| 6,343,904 B1 | 2/2002 | Wang | |
| 6,347,915 B1 | 2/2002 | Baizano | |
| 6,368,038 B1 | 4/2002 | Uno | |
| 6,939,097 B2 | 9/2005 | Carr et al. | |
| 6,976,816 B2 | 12/2005 | Slesinksi et al. | |
| 6,987,660 B2 | 1/2006 | Stevenson et al. | |
| 8,092,129 B2 | 1/2012 | Wiley et al. | |
| 8,353,650 B2 | 1/2013 | Wiley et al. | |
| 8,505,864 B1 | 8/2013 | Taylor et al. | |
| 8,608,418 B2 | 12/2013 | Wiley et al. | |
| 8,888,431 B2 | 11/2014 | Haney | |
| 9,074,616 B2 | 7/2015 | Wiley et al. | |
| D740,113 S | 10/2015 | Olenick | |
| 9,447,813 B2 | 9/2016 | Wiley et al. | |
| 9,500,220 B2 | 11/2016 | Wiley et al. | |
| 10,036,414 B2 | 7/2018 | Wiley et al. | |
| D920,089 S * | 5/2021 | Olenick | D8/399 |
| 2003/0031526 A1 | 2/2003 | Frant | |
| 2012/0244729 A1 | 9/2012 | Rivera et al. | |
| 2013/0316601 A1 | 11/2013 | Kellerman | |
| 2014/0010616 A1 | 1/2014 | Meine et al. | |
| 2014/0273665 A1 | 9/2014 | Haney | |
| 2015/0041211 A1 | 2/2015 | Debock | |
| 2015/0101655 A1 | 4/2015 | Schuit et al. | |
| 2015/0345537 A1 | 12/2015 | Wiley | |
| 2017/0170579 A1 | 6/2017 | Martin | |

FOREIGN PATENT DOCUMENTS

| | | |
|---|---|---|
| FR | 419768 | 7/1939 |
| JP | H06309640 | 11/1994 |

OTHER PUBLICATIONS

International Preliminary Report on Patentability mailed in corresponding PCT/US2019/58365 dated May 14, 2021 (9 pgs).

* cited by examiner

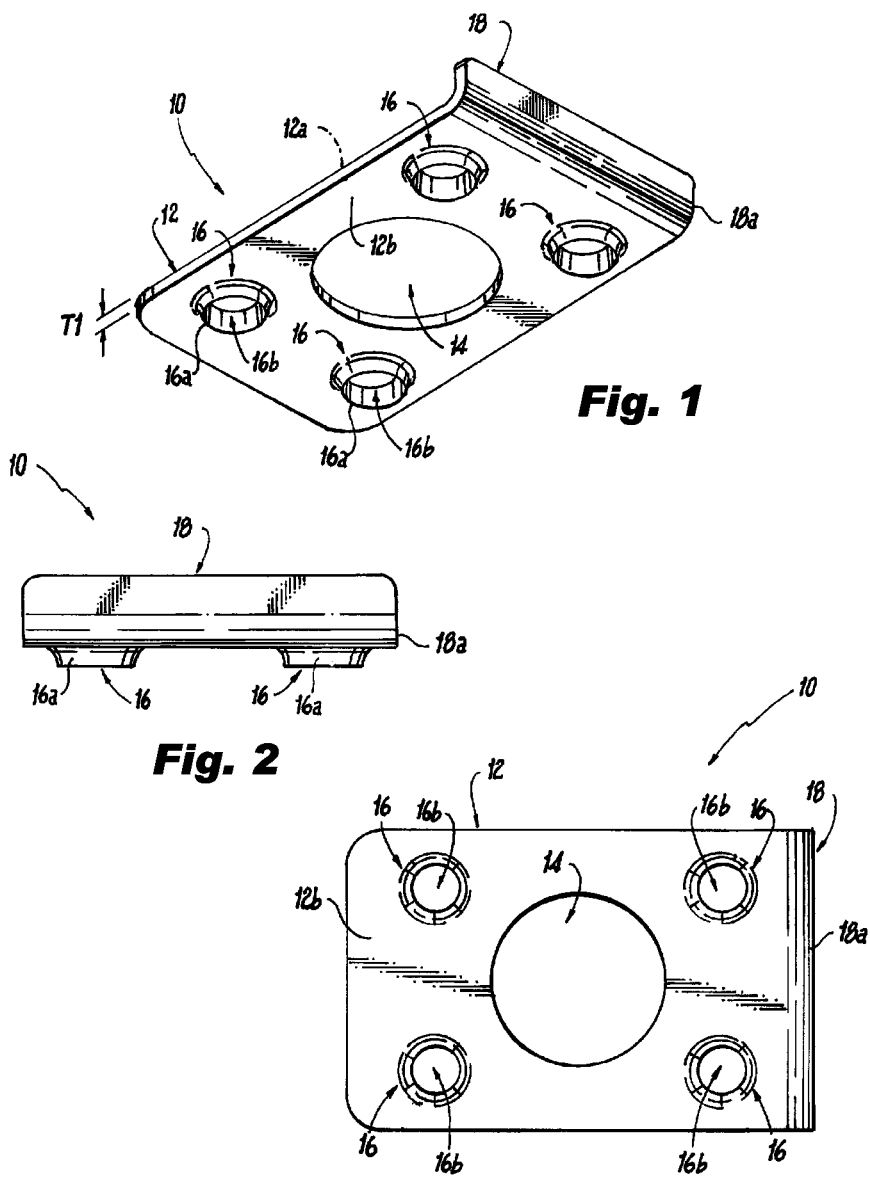

BONDING WASHER

CROSS REFERENCE TO RELATED APPLICATIONS

The present disclosure is a continuation of co-pending U.S. application Ser. No. 16/666,065 filed Oct. 28, 2019, which claims benefit from co-pending U.S. Provisional Patent Application No. 62/751,900 filed on Oct. 29, 2018, the contents of both are incorporated herein in their entirety by reference.

BACKGROUND

Field

The present disclosure relates generally to bonding washers, and more particularly to bonding washers used to create an electrically conductive path between a wire termination and a metal structure coated with a non-conductive material.

Description of the Related Art

Metal structures used to house electrical equipment and devices are often coated with non-conductive material which provides protection from unwanted transfer of electricity or heat, or protection from environmental conditions. For example, a data center or telecommunication rack or enclosure, which is typically a metal structure, may be coated with a non-conductive material to provide such protection. Often, local electrical codes require such metal structures to be bonded as a safety measure. To bond such metal structure, the non-conductive coating has to be removed in order to create an electrically conductive path between the electrical conductor and the metal structure. Typically, a technician would have to remove the non-conductive coating by sanding or grinding the non-conductive coating until bare metal is exposed. However, it is a time-consuming process to carefully remove such coating. Further, if an insufficient amount of coating is removed, an electrically conductive path may not be created. This problem is exacerbated by the fact that there may be large numbers of racks or enclosures as is the case in a data center. As a result, the cost and time taken to bond and ground each rack or enclosure can be significant since it would be time consuming to manually remove the non-conductive coating from enclosure or rack.

SUMMARY

The present disclosure provides descriptions of embodiments for bonding washers used to facilitate electrical bonding of metal structures without the need to grind or sand non-conductive coatings to expose bare metal. In one exemplary embodiment, the bonding washer includes an electrically conductive body having a top surface, a bottom surface, a fastener receiving member, e.g., an aperture, for receiving a mounting fastener, at least one electrically conductive piercing member extending from the bottom surface of the body, and an extended member extending from the electrically conductive body in a direction opposite the at least one piercing member. The electrically conductive body can be substantially planar. In another exemplary embodiment, the bonding washer includes an electrically conductive body having a top surface and a bottom surface, a plurality of electrically conductive piercing members extending from the bottom surface of the body, a plurality of electrically conductive gripping members extending from the top surface of the body, and an extended member extending from the electrically conductive body in a direction away opposite the plurality of piercing members.

In one exemplary embodiment, the extended member extends from one end of the electrically conductive body. In another exemplary embodiment, each of the plurality of piercing members is a single tooth. In some embodiments, the single tooth has a serrated distal end.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 1 is a bottom perspective view of an exemplary embodiment of a bonding washer according to the present disclosure;

FIG. 2 is a front elevation view of the bonding washer of FIG. 1, illustrating one or more piercing members extending from a surface of the bonding washer;

FIG. 3 is a bottom plan view of the bonding washer of FIG. 1;

DETAILED DESCRIPTION

Figure 4:
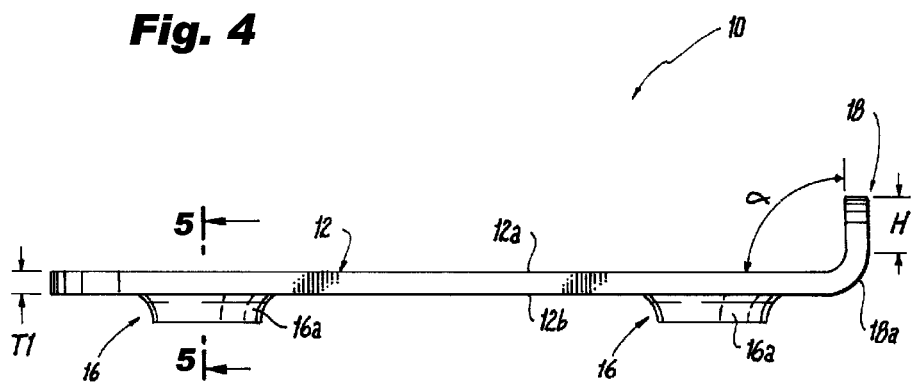
FIG. 4 is a side elevation view of the bonding washer of FIG. 1.

The present disclosure provides descriptions of embodiments for bonding washers used to facilitate an electrical bond between an electrically conductive element and a metal structure that is coated with a non-conductive material. The electrically conductive elements contemplated by the present disclosure include, but are not limited to, elements used to attach an electrical bonding conductor to a metal structure. For example, the electrically conductive elements include wire terminations such as lugs, ferrules, and dead ends. For ease of description, the electrically conductive elements may also be referred to herein as the "wire terminations" in the plural and the "wire termination" in the singular. The metal structures contemplated by the present disclosure include, but are not limited to, metal housing, metal enclosures, metal racks, metal cabinets, metal posts and fencing. For ease of description, the metal structures may also be referred to herein as the "structures" in the plural and the "structure" in the singular. The non-conductive materials coated on the structures contemplated by the present disclosure include, but are not limited to, oxide, paint, anodization, powder coating, epoxy, and enamels. For ease of description, the coating of non-conductive material may also be referred to herein as the "coatings" in the plural and the "coating" in the singular. This specification and the accompanying drawings are to be regarded in an illustrative sense rather than a restrictive sense. Various modifications may be made thereto without departing from the spirit and scope of the present disclosure.

Referring to FIGS. 1-4, an exemplary embodiment of a bonding washer according to the present disclosure is shown. In this exemplary embodiment, the bonding washer 10 includes an electrically conductive body 12 having a top surface 12a, a bottom surface 12b, an aperture 14 for receiving a mounting fastener, and one or more piercing members 16 and one or more extending members 18. The body 12 can be in any shape or size. For example, the body 12 shown in FIGS. 1-4 may be substantially planar with a predetermined thickness "T1" which can vary for each bonding washer 10. The predetermined thickness "T1" depends at least in part on the size of the wire termination, the coating thickness and/or the anticipated or rated current the electrically conductive path is to carry. As a non-limiting example, the thickness "T1" may be in the range from about 0.125 mm to about 1.0 mm. The body 12 is made of a material that provides sufficient structural rigidity to establish and maintain an electrically conductive path between a wire termination, e.g., wire termination 100 and a structure, e.g., structure 300 seen in FIG. 7. Non-limiting examples of the body material include stainless steel or other conductive steel, aluminum and/or aluminum alloy.

Figure 5:
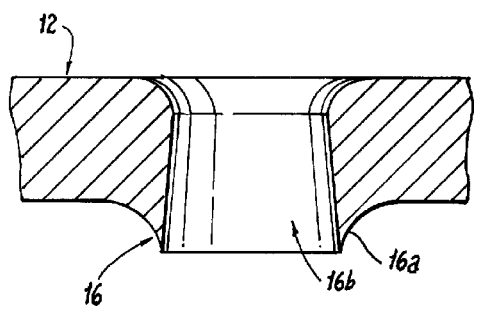
FIG. 5 is a partial cross-sectional view of the bonding washer of FIG. 4 taken along line 5-5, illustrating an exemplary embodiment of a piercing member used to pierce non-conductive coatings on metal structures to establish an electrically conductive path between the bonding washer and the metal structures.
Figure 6:
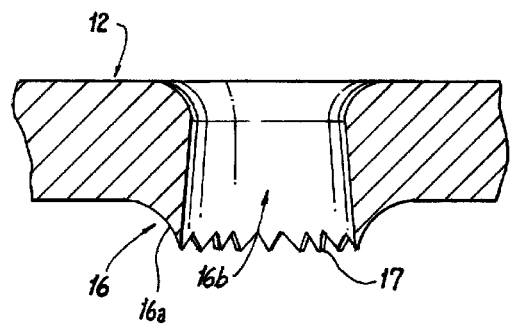
FIG. 6 is a partial cross-sectional view of the bonding washer similar to FIG. 5, illustrating another exemplary embodiment of a piercing member according to the present disclosure.

Referring to FIGS. 5 and 6, each piercing member 16 forms a tooth like structure or what is sometimes called in the industry a "volcano." Each piercing member 16 is capable of cutting through or piercing non-conductive coatings on the structure 300. For example, the piercing member 16 can be a raised surface 16a extending from the bottom surface 12b of the body 12. Such raised surface 16a that includes an aperture 16b having sharp edges surrounding the aperture 16b enables each piercing member 16 to be capable of cutting through or piercing non-conductive coatings on the structure 300. Each piercing member 16 can be a unitary circular or other shaped tooth or structure, seen for example in FIGS. 1 and 5, that is capable of cutting through or piercing the non-conductive coating on the structure 300. In another exemplary embodiment, each piercing member 16 can be a unitary circular or other shaped tooth or structure having a serrated distal edge 17, seen in FIG. 6, that is also capable of cutting through or piercing the non-conductive coatings on the structure 300. The piercing members 16 can be extruded from the body 12, or piercing members 16 can be secured to the body 12 by for example a welded joint. In another exemplary embodiment, the piercing members 16 are also capable of limiting and possibly preventing the wire termination 100 and/or bonding washer 10 from rotating relative to the structure 300 so as to ensure that the piercing members 16 pierce or cut through the coating on the structure 300 to establish or create a sufficient electrically conductive path between the wire termination 100 and the structure 300 to facilitate electrically bonding to the structure 300. For example, as the piercing member 16 pierces the coating on the structure 300 to contact and engage the metal surface of the structure 300, the piercing members 16 partially or entirely burrow into the metal surface of the structure 300 causing the bonding washer 10 to be fixed to the metal structure 300 so as to limit or possibly preventing rotation of the bonding washer 10 relative to the metal structure 300. In this exemplary embodiment, the one or more piercing members 16 are disposed at each corner of the body 12 and extend from the bottom surface 12*b* of the body 12. However, the piercing members 16 may be disposed, placed or arranged on the body 12 in any position suitable to pierce the coating on the structure 300, and establish and maintain an electrically conductive path between the piercing members 16 and the metal of the structure 300. While the above described embodiment shows more than one piercing member 16 used to cut through or pierce the coating on the outer surface of the structure, one skilled in the art would readily recognize the one piercing member 16 may be positioned to pierce the non-conductive coating 302*b*, seen in FIG. 9, on the mounting portion 302.

The one or more extending members 18 extend from one or more ends of the body 12 and are provided to limit and possibly prevent rotation of the wire termination 100 and/or the bonding washer 10 relative to the structure 300 when securing the wire termination 100 and bonding washer 10 to the structure 300. In the embodiment shown, there is one extending member 18 extending from one end of the body 12. However, one skilled in the art would readily appreciate that a second extending member 18 may extend from another end of the body 12. Limiting the rotation of the wire termination 100 and/or the bonding washer 10 relative to the structure 300 helps to ensure that the piercing members 16 pierce or cut through the coating on the structure 300 to establish or create a sufficient electrically conductive path between the wire termination 100 and the metal of the structure 300 to facilitate electrically bonding the structure 300. In one embodiment, the extended member 18 extends outward from the body 12 in a direction that is substantially opposite from the direction the piercing members 16 extend from the body 12. The extended member 18 may be any shape or size. For example, the extended member 18 may be substantially rectangular in shape. The extended member 18 can have a height "H" seen in FIG. 4, which is the length that extended member 18 extends away from the body 12. As a non-limiting example, the height "H" may be equal to or greater than the thickness "T1" of the body 12 or the thickness of the wire termination 100. The extended member 18 can be integrally or monolithically formed to the body 12, or the extended member 18 can be secured to the body 12 by for example a welded joint. The extended member 18 may include a bend 18*a*. As seen in FIG. 4, the bend angle "α" of the bend 18*a* may be in the range of about 30 degrees and about 90 degrees, but other bend angle may be used.

Figure 7:
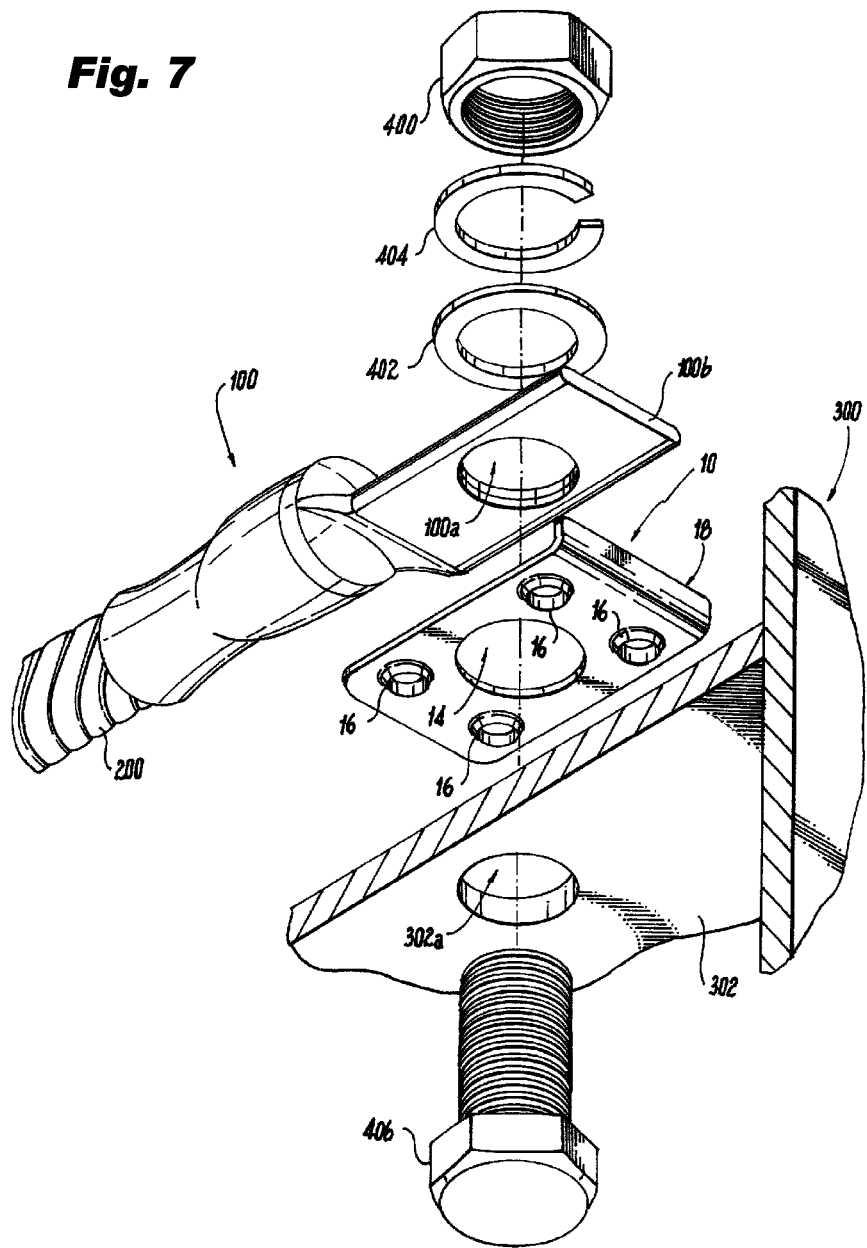
FIG. 7 is a bottom perspective view, with the parts separated, of an exemplary embodiment of the bonding washer of FIG. 1, illustrating a wire termination and a metal structure having an outer surface coated with a non-conductive material.
Figure 8:
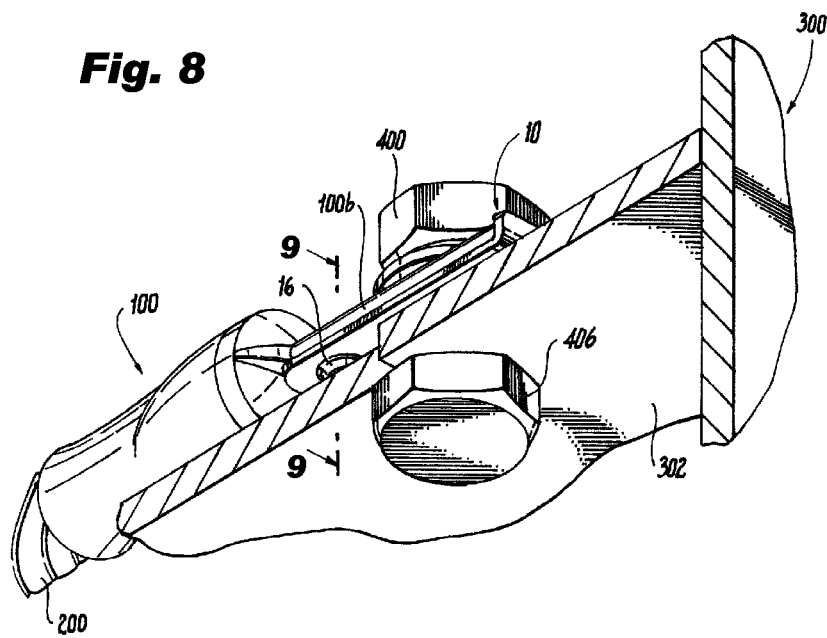
FIG. 8 is a bottom perspective view of the bonding washer, wire termination and metal structure of FIG. 7, with the wire termination and bonding washer connected to the metal structure.
Figure 9:
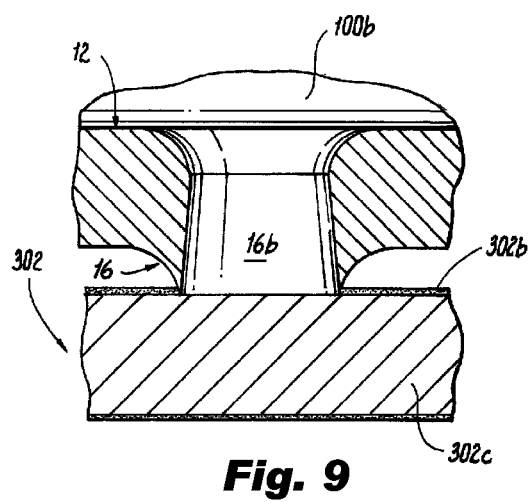
FIG. 9 is a partial cross-sectional view of the wire termination, bonding washer and metal structure of FIG. 8 taken along line 9-9, illustrating the piercing member piercing the non-conductive coating on the metal structure.

Turning to FIGS. 7-9, connecting the bonding washer 10 of the present disclosure to a wire termination 100 and structure 300 to establish an electrically conductive path therebetween will be described. In this exemplary embodiment, the wire termination 100 is a lug. To establish the electrically conductive path to facilitate electrical bonding of the structure 300, an electrical conductor 200 is crimped or otherwise secured to a barrel of wire termination 100 or lug as is known. Examples of electrical conductors include stranded wire, solid wire, wire braids and bus bars. The blade portion 100*b* of the lug 100, which includes an aperture 100*a* configured to receive a mounting fastener, e.g., nut and bolt, rivets, etc., is used to secure the wire termination 100 or lug and the bonding washer 10 to the structure 300. The conductor or wire 200 can be of different gauges depending upon the anticipated or rated current the electrically conductive path is to carry. As such, conductors 200 having a smaller gauge may permit the use of a smaller wire termination 100, while conductors 200 having a greater gauge may necessitate the use of a larger wire termination 100.

In this exemplary embodiment, the structure 300 includes a mounting portion 302 on which the bonding washer 10 rests. The mounting portion 302 includes an aperture 302*a* configured to receive a mounting fastener, e.g., nut and bolt, rivets, etc., used to secure the wire termination 100 and bonding washer 10 to the mounting portion 302. The metal portion or the electrically conductive portion 302*c* of the mounting portion 302 of the structure 300 is covered by a non-conductive coating 302*b*.

To secure the wire termination 100, here a lug, and the bonding washer 10 to the mounting portion 302 of the structure 300, a bolt 406 is passed through the aperture 302*a* in the mounting portion 302, through the aperture 14 in the body 12 of the bonding washer 10, and through the aperture 100*a* in the lug 100. A nut 400 is then attached to the bolt 406 and tightened to secure the lug 100 and the bonding washer 10 to the mounting portion 302 of the structure 300, as shown in FIG. 8. In an exemplary embodiment, a first washer 402, e.g., a flat washer, and/or a second washer 404, e.g., a lock washer, can be placed between the nut 400 and the lug 100 to provide a better connection between the lug 100 and the structure 300. As shown in FIG. 9, when the nut 400 and bolt 406 are tightened, each piercing member 16 cuts through or pierces the non-conductive coating 302*b* on the outer surface of the mounting portion 302 so that an electrically conductive path is established between the conductive metal 302*c* of the mounting portion 302 of the structure 300 and the bonding washer 10. As a result, an electrically conductive path is also established between the conductive metal 302*c* of the mounting portion 302 and the lug 100 such that current may flow from the structure 300 through the bonding washer 10, through the lug 100 to the conductor 200. As noted above, when tightening the nut 400 to the bolt 406, an edge of the lug 100 may contact the extending member 18 of the bonding washer 10 which then limits or possibly prevents the lug 100 and/or bonding washer 10 from rotating relative to the structure 300 so as to ensure that the piercing members 16 pierce or cut through the coating on the structure 300 to establish or create a sufficient electrically conductive path between the wire termination, here the lug 100, and the structure 300. As discussed previously, the piercing members 16 may also limit and possibly prevent rotation of the bonding washer 10 relative to the mounting portion 302 of the structure 300. More specifically, as the piercing members 16 cut through or pierce the non-conductive coating 302b on the outer surface of the mounting portion 302, the piercing members 16 partially or entirely burrow into the conductive metal 302c causing the bonding washer 10 to be fixed in position relative to the structure 300 so as to limit or possibly prevent rotation of the bonding washer 10 relative to the mounting portion 302.

Figure 10:
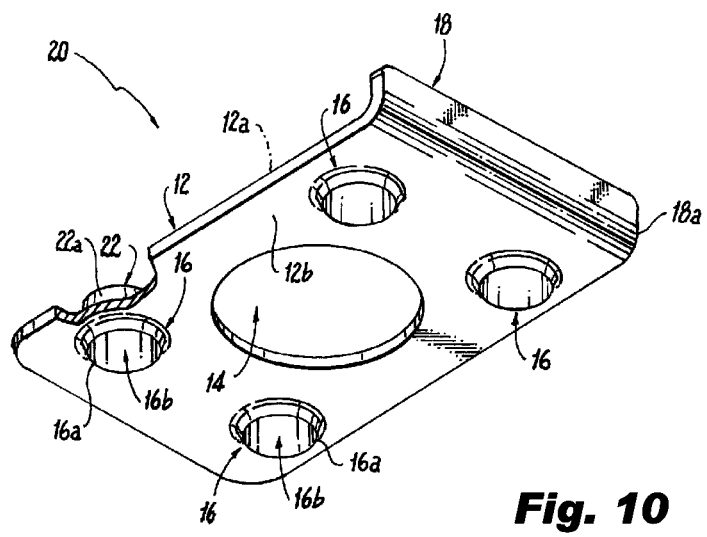
FIG. 10 is a bottom perspective view of another exemplary embodiment of a bonding washer according to the present disclosure.
Figure 11:
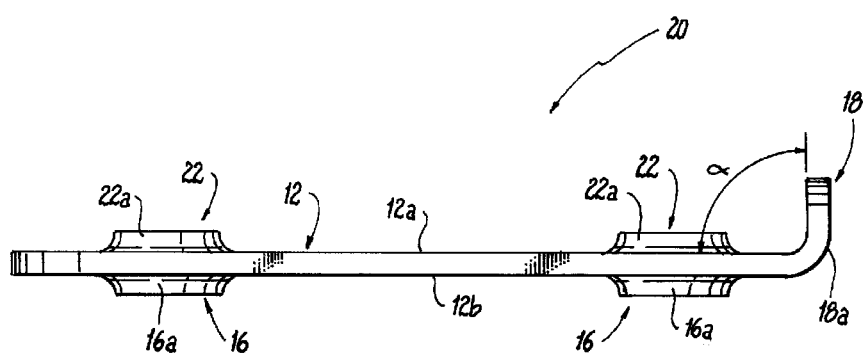
FIG. 11 is a side elevation view of the bonding washer of FIG. 10, illustrating one or more piercing members extending from a first surface of the bonding washer and one or more gripping members extending from a second surface of the bonding washer.

Referring to FIGS. 10 and 11, another exemplary embodiment of a bonding washer according to the present disclosure is shown. In this exemplary embodiment, the bonding washer 20 is substantially the same as the bonding washer 10 described above, except that gripping members 22 are added to the top surface 12a of the body 12 as described below. More specifically, the body portion 12 includes one or more gripping members 22 extending from the top surface 12a. Each gripping member 22 is capable of cutting into or burrowing into the wire termination 100 to limit or possibly prevent the wire termination and/or the bonding washer 20 from rotating relative to the structure 300 so as to ensure that the piercing members 16 pierce or cut through the coating on the structure 300 to establish or create a sufficient electrically conductive path between the wire termination 100 and the structure 300 to facilitate electrical bonding of the structure 300. Each gripping member 22 may also pierce through any non-conductive coatings on the wire termination 100 similar to how the piercing members 16 pierce through the non-conductive coatings on the structure 300. Each gripping member 22 can be a unitary circular or other shaped tooth or structure, seen for example in FIGS. 10 and 13, that is capable of cutting into or burrowing into the wire termination 100, and cutting through or piercing the non-conductive coating, similar to the non-conductive coating 302b shown in FIG. 13, on the wire termination 100. In another exemplary embodiment, each gripping member 22 can be a unitary circular or other shaped tooth or structure having a serrated distal edge, similar to the distal edge 17 seen in FIG. 6, that is also capable of cutting into or burrowing into the wire termination 100 and cutting through or piercing the non-conductive coating on the wire termination 100. The gripping members 22 can be extruded from the body 12, or the gripping members 22 can be secured to the body 12 by for example a welded joint. It is noted that in the embodiment shown, the apertures 16b of the piercing members 16 are aligned with respective apertures 22b of the gripping members 22. One skilled in the art would readily appreciate that the apertures 16b of the piercing members 16 may not be aligned with the apertures 22b of the gripping members 22. In the exemplary embodiment shown, the gripping members 22 are disposed at each corner of the top surface 12a of the body 12. However, the gripping members 22 may be disposed, placed or arranged on the body 12 in any position suitable to burrow into the wire termination 100 or lug, and limit and possibly prevent rotational movement of the wire termination 100 and/or bonding washer 20 relative to the structure 300.

Figure 11A:
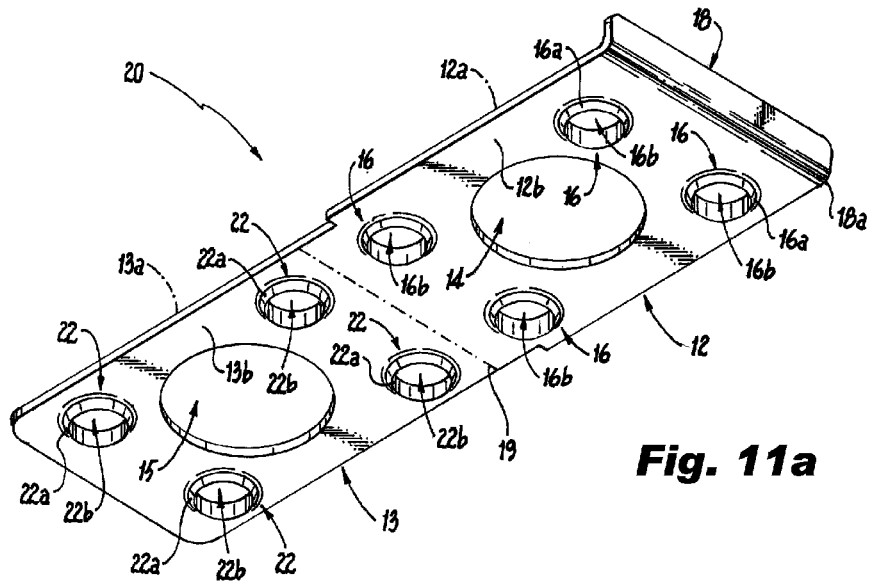
FIG. 11*a* is a bottom perspective view of another exemplary embodiment of a bonding washer similar to FIG. 10, illustrating a duplex bonding washer structure that can be folded over to form a single bonding washer with one or more piercing members extending in a first direction and one or more gripping members extending in a second direction.
Figure 11B:
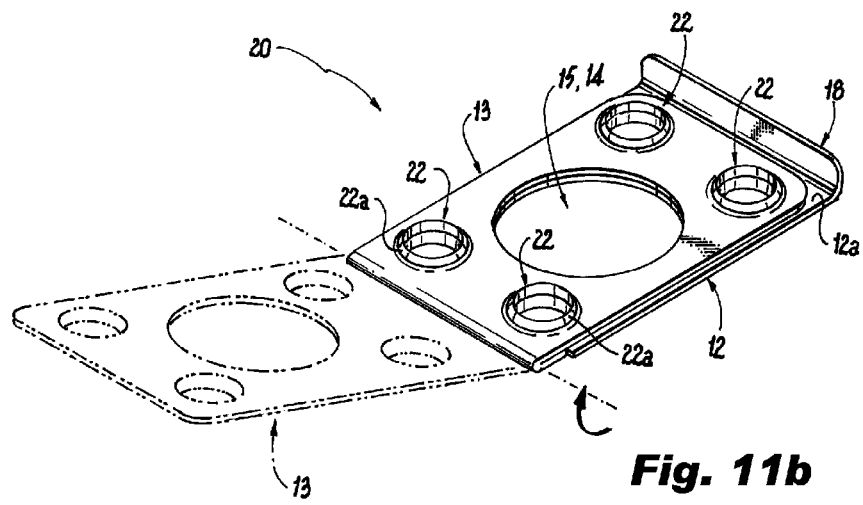
FIG. 11*b* is a top perspective view of the bonding washer of FIG. 11*a*, illustrating one side of the duplex bonding washer structure folded over to form a single bonding washer.

Referring to FIGS. 11a and 11b, another exemplary embodiment of a bonding washer that is similar to the embodiment of FIGS. 10 and 11 is shown. In this exemplary embodiment, the bonding washer 20 is substantially the same as the bonding washer 10 described above, except that gripping members 22 are added to a second body 13 that is joined to the body 12 via a foldable joint 19. More specifically, the second body portion 13 includes one or more gripping members 22 extending from the bottom surface 13b. When the second body 13 is folded relative to the body 12, as shown by the arrow in FIG. 11b, the one or more gripping members 22 face in a direction opposite the direction the piercing members 16 face. Each gripping member 22 is capable of cutting into or burrowing into the wire termination 100 to limit or possibly prevent the wire termination and/or the bonding washer 20 from rotating relative to the structure 300 so as to ensure that the piercing members 16 extending from the bottom surface 12b of the body 12 pierce or cut through the coating on the structure 300 to establish or create a sufficient electrically conductive path between the wire termination 100 and the structure 300 to facilitate electrical bonding of the structure 300. Each gripping member 22 may also pierce through any non-conductive coatings on the wire termination 100 similar to how the piercing members 16 pierce through the non-conductive coatings on the structure 300. Each gripping member 22 can be a unitary circular or other shaped tooth or structure, seen for example in FIG. 11a, that is capable of cutting into or burrowing into the wire termination 100, and cutting through or piercing the non-conductive coating, similar to the non-conductive coating 302b shown in FIG. 13, on the wire termination 100. In another exemplary embodiment, each gripping member 22 can be a unitary circular or other shaped tooth or structure having a serrated distal edge, similar to the distal edge 17 seen in FIG. 6, that is also capable of cutting into or burrowing into the wire termination 100 and cutting through or piercing the non-conductive coating on the wire termination 100. The gripping members 22 can be extruded from the body 12, or the gripping members 22 can be secured to the body 12 by for example a welded joint. It is noted that in the embodiment shown, the apertures 16b of the piercing members 16 are aligned with respective apertures 22b of the gripping members 22. One skilled in the art would readily appreciate that the apertures 16b of the piercing members 16 may not be aligned with the apertures 22b of the gripping members 22. In the exemplary embodiment shown, the gripping members 22 are disposed at each corner of the top surface 12a of the body 12. However, the gripping members 22 may be disposed, placed or arranged on the body 12 in any position suitable to burrow into the wire termination 100 or lug, and limit and possibly prevent rotational movement of the wire termination 100 and/or bonding washer 20 relative to the structure 300.

Figure 12:
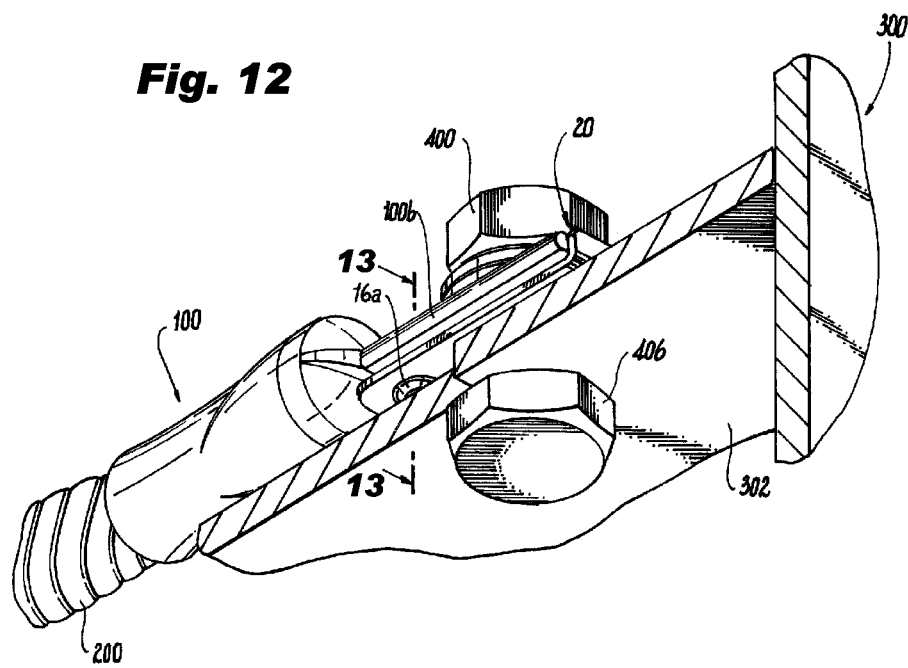
FIG. 12 is a bottom perspective view of the bonding washer of FIG. 10 and a wire termination connected to a metal structure having an outer surface coated with a non-conductive material.
Figure 13:
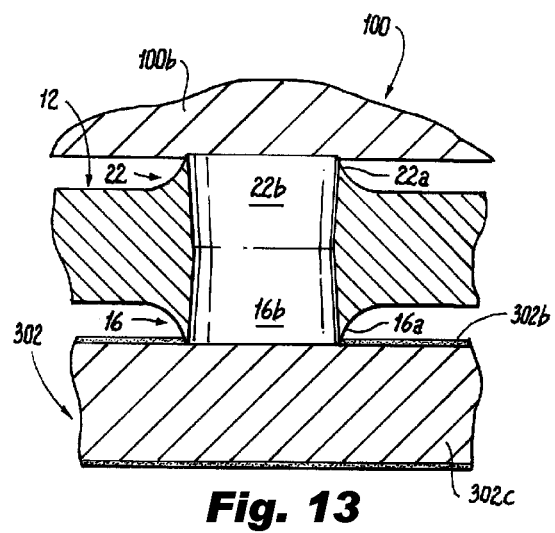
FIG. 13 is a partial cross-sectional view of the wire termination, bonding washer and metal structure of FIG. 12 taken along line 13-13, illustrating a piercing member piercing the non-conductive coating on the metal structure and a gripping member engaging the wire termination.

Referring to FIGS. 12 and 13, connecting the bonding washer 20 of the present disclosure to a wire termination 100 and structure 300 to establish an electrically conductive path therebetween is similar to that described above for bonding washer 10 and for ease of description is not repeated. However, in this exemplary embodiment, when the nut 400 and bolt 406 are tightened, each gripping member 22 cuts into or burrows into the blade portion 100b of the wire termination 100 or lug to limit or possibly prevent the wire termination 100, and/or the bonding washer 20 from rotating relative to the structure 300 so as to ensure that the piercing members 16 pierce or cut through the coating 302b on the mounting portion 302 of the structure 300 to establish or create a sufficient electrically conductive path between the wire termination 100 and the metal of the structure 300 to facilitate electrical bonding of the structure 300.

Referring now to FIGS. 14 and 14a-17, additional exemplary embodiment of a bonding washer according to the present disclosure is shown. In the exemplary embodiment of FIGS. 14-17, the bonding washer is a duplex bonding washer 30. The bonding washer 30 includes an electrically conductive body 32 formed of a first body portion 34 and a second body portion 36 that are joined by one or more breakaway segments 38. The first body portion 34 has a top surface 34a, a bottom surface 34b, an aperture 40 for receiving a mounting fastener, e.g., a nut and bolt, and one or more piercing members 42 extending from one of the surfaces of the first body portion 34, e.g., the bottom surface 34b. The second body portion 36 has a top surface 36a, a bottom surface 36b, an aperture 44 for receiving a mounting fastener, e.g., a nut and bolt, one or more piercing members 46 extending from one of the surfaces of the second body portion 36, e.g., the bottom surface 36b, and one or more extended members 48 having a bend 48a. The extended members 48 are substantially similar to the extended members 18 described above and for ease of description are not repeated. In the exemplary embodiment of FIG. 14a, the bonding washer 30 is also a duplex bonding washer which is similar to the bonding washer of FIGS. 14-17 except that the aperture 40 is removed from the first body portion 34 so that the first body portion 34 has a top surface 34a, a bottom surface 34b, and one or more piercing members 42 extending from one of the surfaces of the first body portion 34, e.g., the bottom surface 34b. The second body portion 36 is substantially similar to the second body portion of FIGS. 14-17 and for ease of description is not repeated. The extended members 48 are substantially similar to the extended members 18 described above and for ease of description are not repeated.

The body 32 can be in any shape or size. For example, the body 32 may be substantially planar with a predefined thickness similar to thickness "T1" described above, which can vary for each bonding washer 30. The body 32 is made of a material that provides sufficient structural rigidity to establish and maintain an electrically conductive path between a wire termination, e.g., wire termination 100, and a structure, e.g., structure 300 seen in FIG. 17. Non-limiting examples of the body material include stainless steel or other conductive steel, aluminum and/or aluminum alloy. As noted above, the one or more breakaway segments 38 join the first body portion 34 to the second body portion 36. The one or more breakaway segments 38 permit the body 32 to be modified from a duplex bonding washer to a single bonding washer by articulating, bending or cutting the body portions until the first body portion 34 breaks away from the second body portion 36.

Each piercing member 42 extending from the first body portion 34 of the bonding washer 30 and each piercing member 46 extending from the second body portion 36 of the bonding washer 30 forms a tooth-like structure or what is sometimes called in the industry a "volcano." Each piercing member 42 and 46 is capable of cutting through or piercing non-conductive coatings 302b on the structure 300. For example, each piercing member 42 and 46 can be a raised surface 42a or 46a extending from the respective bottom surface 34b or 36b of the respective body portions 34 or 36. Such raised surface 42a or 46a includes an aperture 42b or 46b having sharp edges surrounding the aperture 42b or 46b that enables each piercing member 42 or 46 to be capable of cutting through or piercing non-conductive coatings 302b on the structure 300. Each piercing member 42 or 46 can be a unitary circular or other shaped tooth or structure, similar to the piercing member 16 seen in FIGS. 14 and 16, that is capable of cutting through or piercing the non-conductive coating on the structure. In another exemplary embodiment, each piercing member 42 and 46 can be a unitary circular or other shaped tooth or structure having a serrated distal edge, which is similar to the distal edge 17 seen in FIG. 6, that is also capable of cutting through or piercing the non-conductive coatings 302b on the structure 300. The piercing members 42 and 46 can be extruded from the body 32, or the piercing members 42 and 46 can be secured to the respective body portions 34 and 36 by for example a welded joint. In another exemplary embodiment, the piercing members 42 and 46 are also capable of limiting and possibly preventing the wire termination 100 and/or bonding washer 30 from rotating relative to the structure so as to ensure that the piercing members 42 and 46 pierce or cut through the coating on the structure 300 to establish or create a sufficient electrically conductive path between the wire termination 100 and the metal of the structure 300. For example, as the electrical bonding members 42 and 46 pierce the coating on the structure 300 to contact and engage the metal surface 302c of the structure 300, the piercing members 42 and 46 partially or entirely burrow into the metal surface 302c of the structure 300 causing the bonding washer 30 to be fixed in position relative to the structure 300 so as to limit or possibly preventing rotation of the bonding washer 30 relative to the structure 300. While the above described embodiment shows more than one piercing member 42 extending from the first body portion 34 and more than one piercing member 46 extending from the second body portion 36, one skilled in the art would readily recognize the one piercing member 42 may be positioned on the first body portion 34 and one piercing member 46 may be positioned on the second body portion 36 to pierce the non-conductive coating 302b on the mounting portion 302.

In this exemplary embodiment, the one or more piercing members 42 extend from the bottom surface 34b of the first body portion 34 and are disposed at each corner of the first body portion 34 as shown. However, the piercing members 42 may be disposed, placed or arranged on the first body portion 34 in any position suitable to pierce the coating on the structure 300, and establish and maintain an electrically conductive path between the piercing members 42 and the structure 300. Similarly, the one or more piercing members 46 extend from the bottom surface 36b of the second body portion 36 and are disposed at each corner of the second body portion 36 as shown. However, the piercing members 46 may be disposed, placed or arranged on the second body portion 36 in any position suitable to pierce the coating on the structure, e.g., structure 300, and establish and maintain an electrically conductive path between the piercing members 46 and the structure 300.

Figure 17:
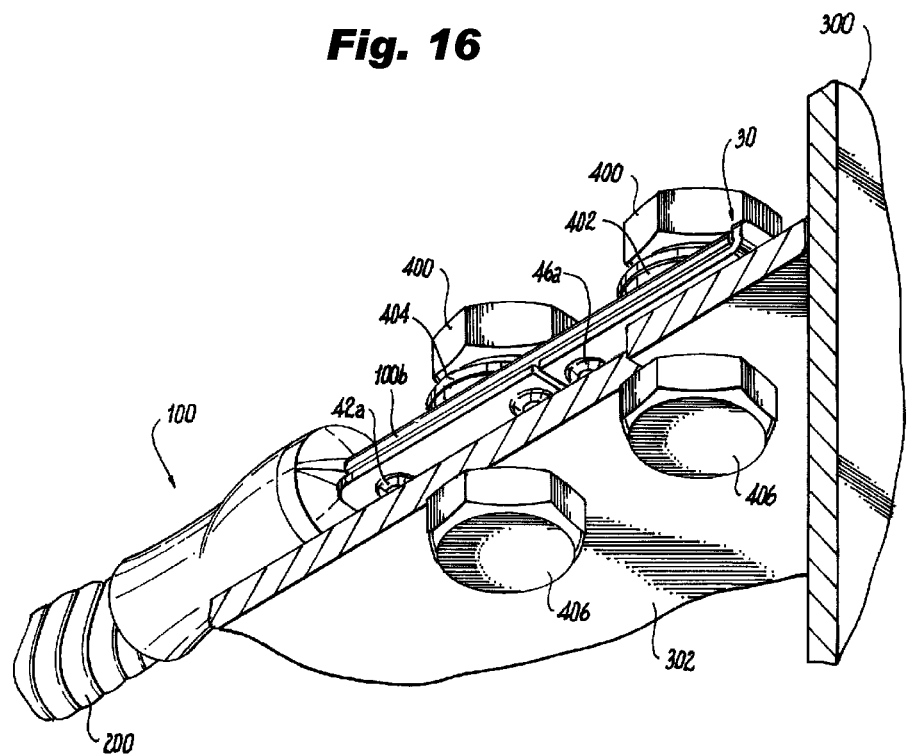
FIG. 17 is a bottom perspective view of the bonding washer of FIG. 14 and a wire termination connected to a metal structure having an outer surface coated with a non-conductive material.

Referring to FIG. 17, connecting the bonding washer 30 of the present disclosure to a wire termination 100 and structure 300 to establish an electrically conductive path therebetween will be described. In this exemplary embodiment, the wire termination 100 is a lug. To establish the electrically conductive path to facilitate electrical bonding of the structure 300, an electrical conductor 200 is crimped or otherwise secured to a barrel of the lug 100 as is known. The blade portion 100b of the lug 100, which includes two apertures that are similar to aperture 100a seen in FIG. 7, can receive mounting fasteners, e.g., nuts and bolts, rivets, etc., used to secure the lug 100 and the bonding washer 30 to the structure 300. The conductor or wire 200 can be of different gauges depending upon the anticipated or rated current the electrically conductive path is to carry. As such, conductors 200 having a smaller gauge may permit the use of a smaller lug 100, while conductors 200 having a greater gauge may necessitate the use of a larger lug 100. In this exemplary embodiment, the structure 300 includes a mounting portion 302 on which the bonding washer 30 rests. The mounting portion 302 includes two apertures that are similar to aperture 302a seen in FIG. 7, configured to receive the mounting fasteners used to secure the lug 100 and bonding washer 30 to the mounting portion 302. As described herein, the metal portion or the electrically conductive portion 302c, seen in FIG. 9, of the mounting portion 302 is covered by a coating 302b.

Figure 14:
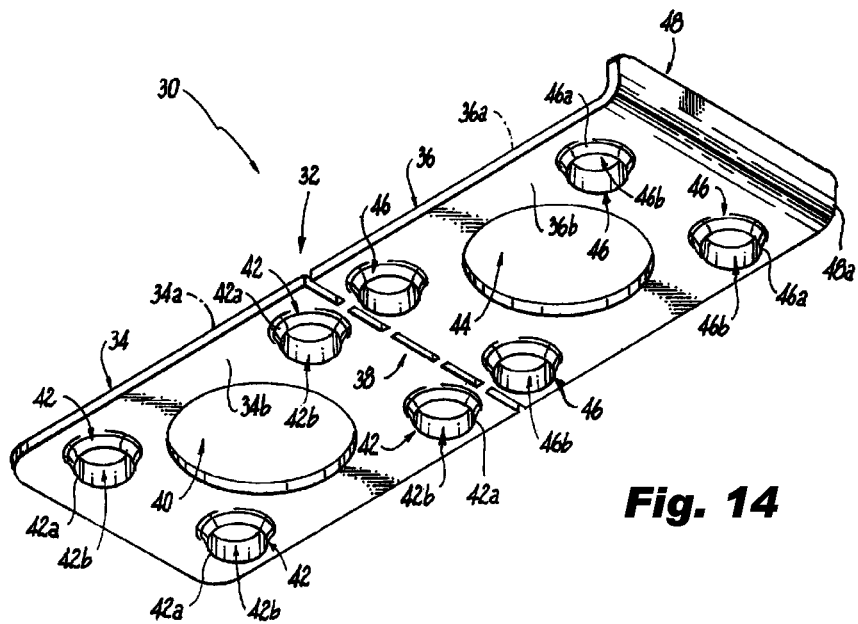
FIG. 14 is a bottom perspective view of another exemplary embodiment of a bonding washer according to the present disclosure, illustrating a duplex bonding washer structure with one or more breakaway segments.
Figure 14A:
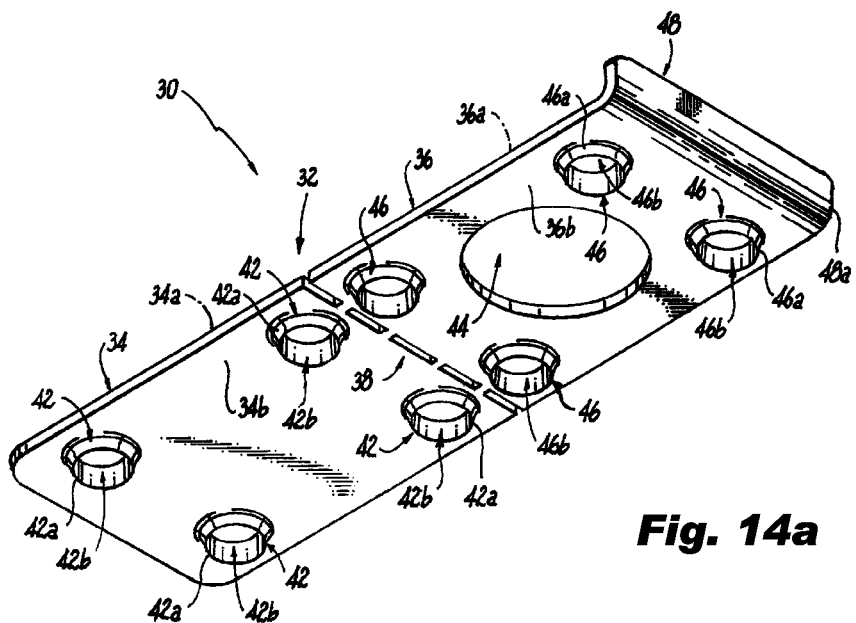
FIG. 14a is a bottom perspective view of another exemplary embodiment of a bonding washer according to the present disclosure, illustrating a duplex bonding washer structure with one or more breakaway segments.
Figure 15:
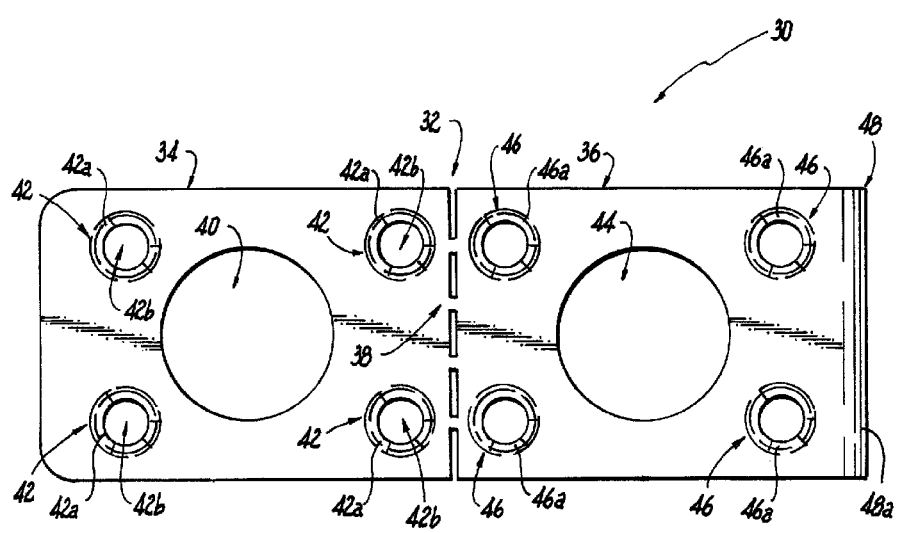
FIG. 15 is a bottom plan view of the bonding washer of FIG. 14.

To secure the wire termination 100, here a lug, and the bonding washer 30 to the mounting portion 302 of the structure 300, the bolts 406 are passed through respective apertures 302a, seen in FIG. 7, in the mounting portion 302, through the respective apertures 40 and 44, seen in FIG. 14, in the body 32 of the bonding washer 30, and through the respective aperture 100a in the lug 100. The nut 400 is then attached to the respective bolt 406 and tightened to secure the lug 100 and the bonding washer 30 to the mounting portion 302 of the structure 300, as shown in FIG. 17. In an exemplary embodiment, first washers 402, e.g., flat washers, and/or second washers 404, e.g., lock washers, can be placed between the nuts 400 and the lug 100 to provide a better connection between the lug 100 and the structure 300. Similar to that shown in FIG. 9, when the nuts 400 and bolts 406 are tightened, each piercing member 42 and 46 cuts through or pierces the non-conductive coating 302b on the outer surface of the mounting portion 302 so that an electrically conductive path is established between the conductive metal 302c of the mounting portion 302 and the bonding washer 30. As a result, an electrically conductive path is also established between the conductive metal 302c of the of the structure 300 and the lug 100 such that current may flow from the structure 300 through the bonding washer 30, through the lug 100 to the conductor 200.

Figure 16:
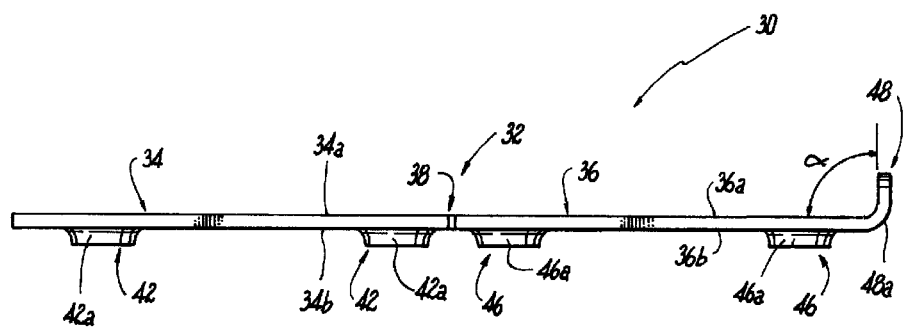
FIG. 16 is a side elevation view of the bonding washer of FIG. 14.

In addition, when tightening the nuts 400 to the bolts 406, an edge of the lug 100 may contact the extending member 48, as shown in FIG. 16 of the bonding washer 30 which then limits or possibly prevents the lug 100 and/or bonding washer 30 from rotating relative to the structure 300 so as to ensure that the piercing members 42 and 46 pierce or cut through the coating on the structure 300 to establish or create a sufficient electrically conductive path between the wire termination, here the lug 100, and the structure 300 to facilitate electrical bonding of the structure 300. As discussed previously, the piercing members 42 and 46 may also limit and possibly prevent rotation of the bonding washer 30 relative to the mounting portion 302 of the structure 300. More specifically, as the piercing members 42 and 46 cut through or pierce the non-conductive coating 302b on the outer surface of the mounting portion 302, the piercing members 42 and 46 partially or entirely burrow into the conductive metal 302c causing the bonding washer 30 to be fixed in position relative to the structure 300 so as to limit or possibly prevent rotation of the bonding washer 30 relative to the mounting portion 302 of the structure 300.

Figure 18:
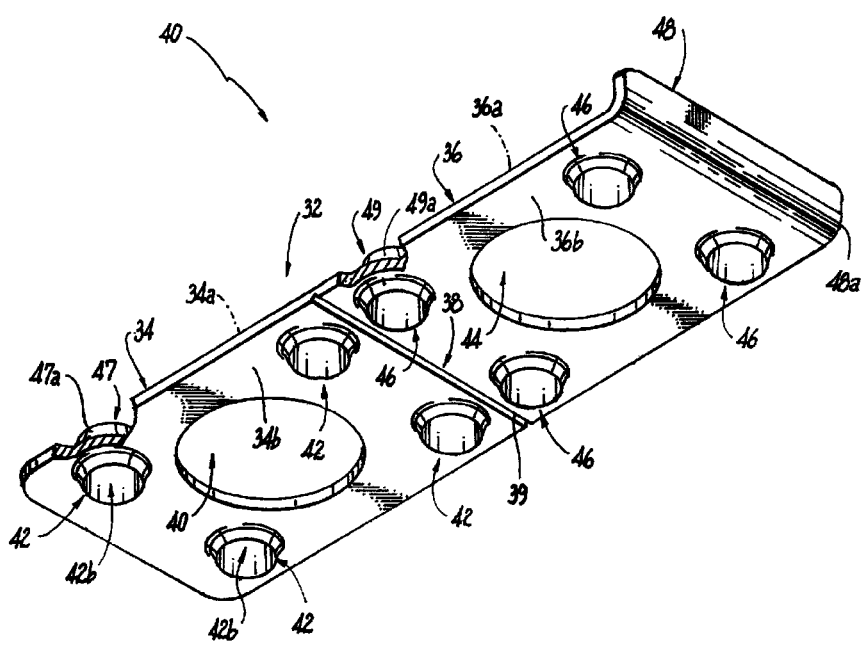
FIG. 18 is a bottom perspective view of another exemplary embodiment of a bonding washer according to the present disclosure, illustrating a duplex bonding washer structure with one or more breakaway segments, and illustrating each bonding washer portion having one or more piercing members extending from a first surface of the respective bonding washer portion and one or more gripping member extending from a second surface of the of the respective bonding washer portion.
Figure 19:
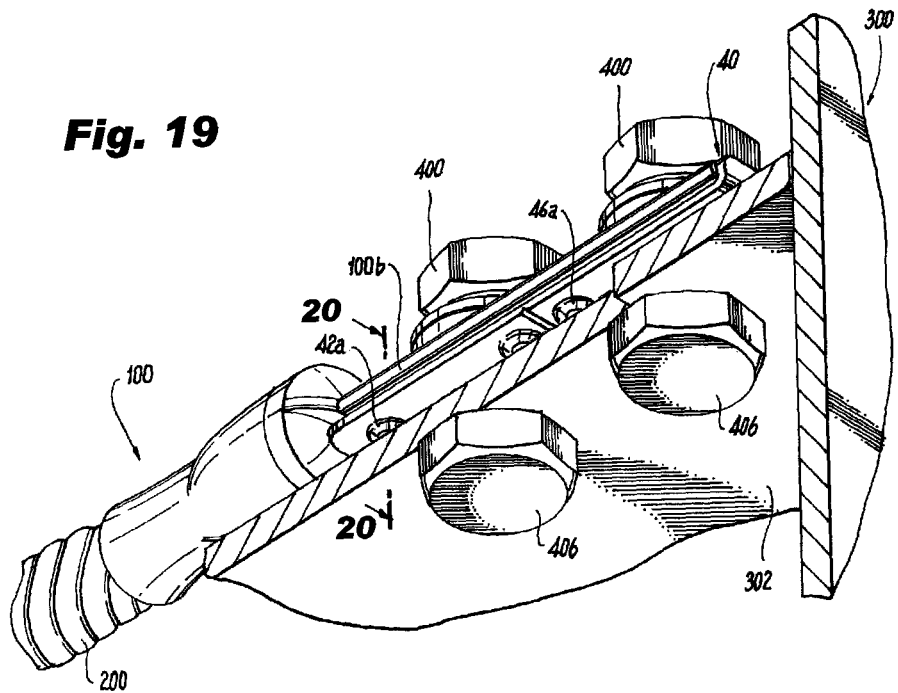
FIG. 19 is a bottom perspective view of the bonding washer of FIG. 18 and a wire termination connected to a metal structure having an outer surface coated with a non-conductive material.
Figure 20:
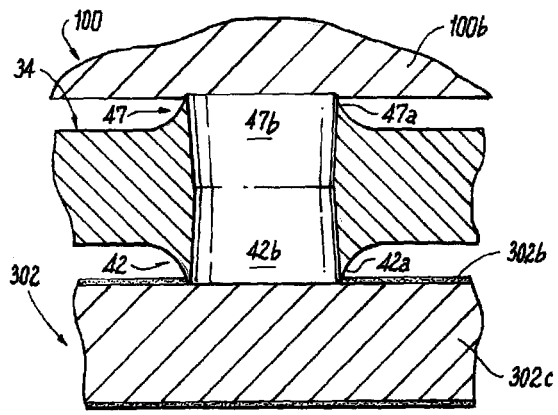
FIG. 20 is a partial cross-sectional view of the wire termination, bonding washer and metal structure of FIG. 19 taken along line 20-20, illustrating a piercing member piercing the non-conductive coating on the metal structure and a gripping member engaging the wire termination.

Referring now to FIGS. 18-20, another exemplary embodiment of a bonding washer according to the present disclosure is shown. In this exemplary embodiment, the bonding washer 40 is substantially the same as the bonding washer 30 described above, except that the one or more breakaway segments differ, and gripping members are added to the top surface of the first and second body portions as described below. In this exemplary embodiment, the one or more breakaway segments 38 includes a groove 39 extending along the body 32 between the first body portion 34 and the second body portion 36 that can be repeatedly articulated or bent to break the first body portion 34 away from the second body portion 36.

Continuing to refer to FIGS. 18-20, the first body portion 34 also includes one or more gripping members 47 extending from the top surface 34a. Similarly, the second body portion 36 includes one or more gripping members 49 extending from the top surface 36a. Each gripping member 47 and 49 is capable of cutting into or burrowing into the wire termination 100 to limit or possibly prevent the wire termination 100 and/or the bonding washer 30 from rotating relative to the structure 300 so as to ensure that the piercing members 42 and 46 pierce or cut through the coating on the structure to establish or create a sufficient electrically conductive path between the wire termination and the structure to facilitate electrically bonding the structure. Each gripping member 47 and 49 may also pierce through any non-conductive coatings on the wire termination similar to how the piercing members 42 and 46 pierce through the non-conductive coatings on the structure. Each gripping member 47 and 49 can be a unitary circular or other shaped tooth or structure, seen for example in FIGS. 18 and 20, that is capable of capable of cutting into or burrowing into the wire termination 100, and cutting through or piercing the non-conductive coating on the wire termination 100. In another exemplary embodiment, each gripping member 47 and 49 can be a unitary circular or other shaped tooth or structure having a serrated distal edge, similar to the distal edge 17 seen in FIG. 6, that is also capable of cutting into or burrowing into the wire termination 100 and cutting through or piercing the non-conductive coating on the wire termination 100. The gripping members 47 and 49 can be extruded from the body 32, or the gripping members 47 and 49 can be secured to the respective body portion 34 or 36 by for example a welded joint. In the exemplary embodiment shown, the gripping members 47 and 49 are disposed at each corner of the top surface 34a or 36a of the respective body portions 34 and 36. However, the gripping members 47 and 49 may be disposed, placed or arranged on the respective body portions 34 or 36 in any position suitable to burrow into the wire termination 100, e.g., lug, and limit and possibly prevent rotational movement of the wire termination 100 and/or bonding washer 40 relative to the structure 300.

It is noted that in the embodiment shown, the apertures 42b of the piercing members 42 are aligned with respective apertures 47b of the gripping members 47. However, one skilled in the art would readily appreciate that the apertures 42b of the piercing members 42 may not be aligned with the apertures 47b of the gripping members 47. Each gripping member 47 can be a unitary circular or other shaped tooth 47 or component having a serrated distal edge similar to the serrated edge 17 seen in FIG. 6. Similarly, the apertures 46b of the piercing members 46 are aligned with respective apertures 49b of the gripping members 49. Each gripping member 49 can be a unitary circular or other shaped tooth 49 or component having a serrated distal edge similar to the serrated edge 17 seen in FIG. 6. However, one skilled in the art would readily appreciate that the apertures 46b of the piercing members 46 may not be aligned with the apertures 49b of the gripping members 49.

Referring to FIGS. 19 and 20, connecting the bonding washer 40 of the present disclosure to a wire termination 100 and structure 300 to establish an electrically conductive path therebetween is similar to that described above for bonding washer 30 and for ease of description is not repeated. However, in this exemplary embodiment, when the nut 400 and bolt 406 are tightened, each gripping member 47 and 49 cuts into or burrows into the blade portion 100b of the wire termination 100 to limit or possibly prevent the wire termination 100, e.g., the lug, and/or the bonding washer 40 from rotating relative to the structure 300 so as to ensure that the piercing members 42 and 46 pierce or cut through the coating 302b on the mounting portion 302 of the structure 300 to establish or create a sufficient electrically conductive path between the wire termination 100 and the structure 300 to facilitate electrically bonding the structure.

Figure 21:
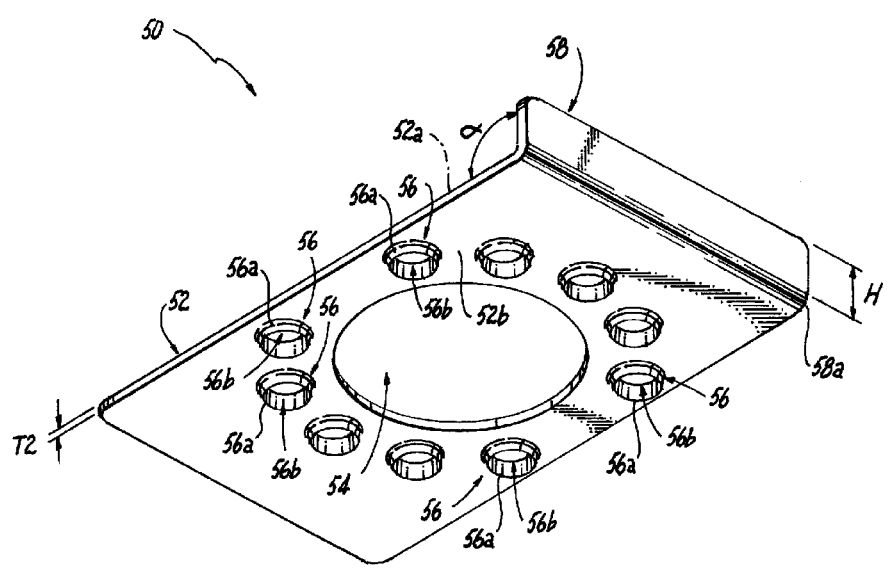
FIG. 21 is a bottom perspective view of another exemplary embodiment of a bonding washer according to the present disclosure, illustrating one or more piercing members extending from a surface of the bonding washer.
Figure 22:
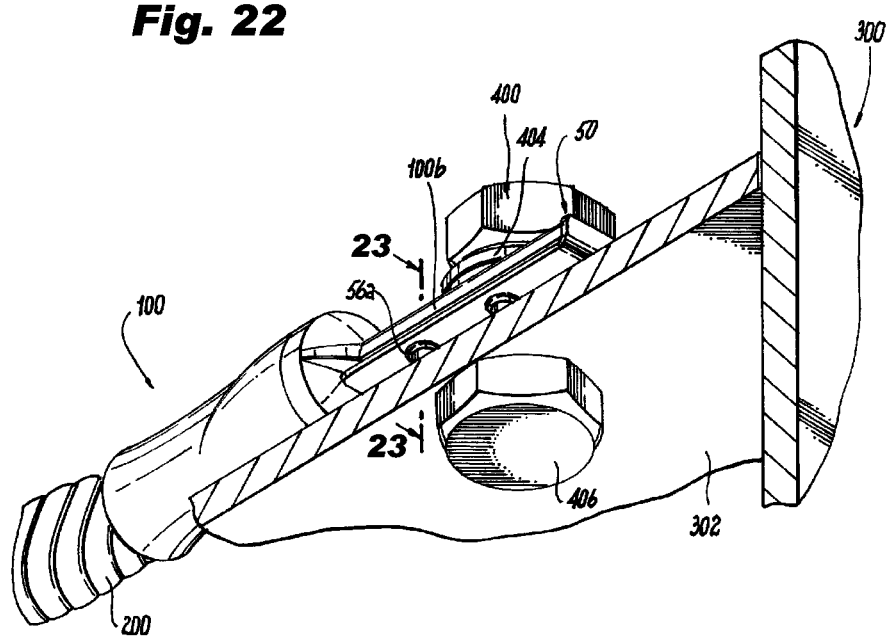
FIG. 22 is a bottom perspective view of the bonding washer of FIG. 21 and a wire termination connected to a metal structure having an outer surface coated with a non-conductive material.
Figure 23:
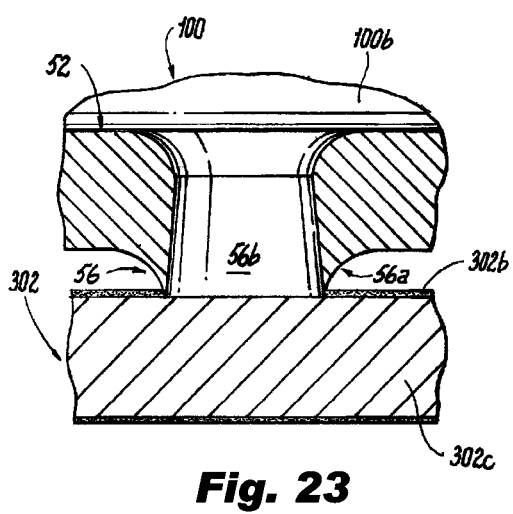
FIG. 23 is a partial cross-sectional view of the wire termination, bonding washer and metal structure of FIG. 22 taken along line 23-23, illustrating a piercing member piercing the non-conductive coating on the metal structure.

Turning now to FIGS. 21-23, another exemplary embodiment of a bonding washer according to the present disclosure is shown. In this exemplary embodiment, the bonding washer 50 is configured and dimensioned to work with smaller wire terminations 100, e.g., smaller lugs. The bonding washer 50 includes an electrically conductive body 52 having a top surface 52a, a bottom surface 52b, an aperture 54 for receiving a mounting fastener, one or more piercing members 56 and an extended member 58 having a bend 58a. The body 52 can be in any shape or size. For example, the body 52 shown in FIG. 21 may be substantially planar with a predetermined thickness "T2." The predetermined thickness "T2" depends at least in part on the size of the wire termination 100 and/or the anticipated or rated current the electrically conductive path is to carry. As a non-limiting example, the thickness "T2" may be in the range from about 0.125 mm to about 1.0 mm. In an exemplary embodiment, the predetermined thickness "T2" of the bonding washer 50 may be less than the thickness "T1" of the bonding washer 10 described above. For example, the predetermined thickness "T2" may be less than half the predetermined thickness "T1."

Each piercing member 56 forms a tooth-like structure or what is sometimes called in the industry a "volcano." Each piercing member 56 is capable of cutting through or piercing non-conductive coatings 302b on the structure 300. For example, the piercing member 56 can be a raised surface 56a extending from the bottom surface 52b of the body 52. Such raised surface 56a includes an aperture 56b having sharp edges surrounding the aperture 56b that enables each piercing member 56 to be capable of cutting through or piercing non-conductive coatings 302b on the structure 300. Each piercing member 56 can be a unitary circular or other shaped tooth or structure, seen for example in FIGS. 21 and 23, that is capable of cutting through or piercing the non-conductive coating on the structure. In another exemplary embodiment, each piercing member 56 can be a unitary circular or other shaped tooth or structure having a serrated distal edge similar to distal edge 17, seen in FIG. 6, that is also capable of cutting through or piercing the non-conductive coatings 302b on the structure 300. The piercing members 56 can be extruded from the body 52, or the piercing members 56 can be secured to the body 52 by for example a welded joint. In another exemplary embodiment, the piercing members 56 are also capable of limiting and possibly preventing the wire termination 100 and/or bonding washer 50 from rotating relative to the structure 300 so as to ensure that the piercing members 56 pierce or cut through the coating on the structure to establish or create a sufficient electrically conductive path between the wire termination 100 and the metal of the structure 300. For example, as the piercing members 56 pierce the coating on the structure to contact and engage the metal surface of the structure 300, the piercing members 56 partially or entirely burrow into the metal surface of the structure 300 causing the bonding washer 50 to be fixed in position relative to the structure 300 so as to limit or possibly preventing rotation of the bonding washer 50 relative to the structure 300. In this exemplary embodiment, the one or more piercing members 56 are disposed around the aperture 54 and extend from the bottom surface 52b of the body 52. However, the piercing members 56 may be disposed, placed or arranged on the body 52 in any position suitable to pierce the coating on the structure, e.g., structure 300, and establish and maintain an electrically conductive path between the piercing members 56 and the structure 300.

In addition, with the predetermined thickness "T2" of the body 52 being thinner than the predetermined thickness "T1" of for example body 12 of bonding washer 10, it may be advantageous to include a greater number of piercing members 56 on the body 52. Having a greater number of piercing members 56 ensures the bonding washer 50 established a sufficient number of electrically conductive paths between the bonding washer 50 and the structure 300 in the event the thinner body 52 slightly flexes by the force applied by the mounting fastener when securing the wire termination and bonding washer 50 to the structure 300. In other words, when the wire termination 100 and bonding washer 50 are secured to the structure 300, the force applied by the mounting fastener and wire termination 100 to the bonding washer 50 is more evenly distributed to the larger number of piercing members 56 creating a sufficient number of electrically conductive paths between the bonding washer 50 and the structure, e.g., structure 300.

The extending member 58 extends from at least one end of the body 52 and is provided to limit and possibly prevent rotation of the wire termination 100, e.g., lug seen in FIG. 22, and/or the bonding washer 50 relative to the structure 300 when securing the wire termination 100 and bonding washer 50 to the structure 300. Limiting the rotation of the wire termination and/or the bonding washer 50 relative to the structure 300 helps to ensure that the piercing members 56 pierce or cut through the coating on the structure 300 to establish or create a sufficient electrically conductive path between the wire termination 100 and the structure to electrically bond the structure 300. In one embodiment, the extended member 18 extends outward from the body 52 in a direction that is substantially opposite from the direction the piercing members 56 extend from the body 52. The extended member 58 may be any shape or size. For example, the extended member 18 may be substantially rectangular in shape. The extended member 58 can have a height "H" seen in FIG. 21, which is the length that extended member 58 extends away from the body 52. As a non-limiting example, the height "H" may be equal to or greater than the thickness "T2" of the body 52. The extended member 58 can be integrally or monolithically formed to the body 52, or the extended member 58 can be secured to the body 52 by for example a welded joint. The extended member 58 may include a bend 58a. As seen in FIG. 21, the bend angle "a" of the bend 58a may be in the range of about 30 degrees and about 90 degrees, but other bend angle may be used.

Referring to FIGS. 22 and 23, connecting the bonding washer 50 of the present disclosure to a wire termination 100 and structure 300 to establish an electrically conductive path therebetween will be described. In this exemplary embodiment, the wire termination 100 is a lug. To establish the electrically conductive path to facilitate electrically bonding of the structure 300, an electrical conductor 200 is crimped or otherwise secured to a barrel of the lug 100 as is known. The blade portion 100b of the lug 100, which includes an aperture 100a configured to receive a mounting fastener, e.g., nut and bolt, rivets, etc., used to secure the lug 100 and the bonding washer 50 to the structure 300. As noted, the conductor or wire 200 can be of different gauges depending upon the anticipated or rated current the electrically conductive path is to carry. As such, conductors 200 having a smaller gauge may permit the use of a smaller lug 100, while conductors 200 having a greater gauge may necessitate the use of a larger lug 100. In this exemplary embodiment, the structure 300 includes a mounting portion 302 on which the bonding washer 50 rests. The mounting portion 302 includes an aperture 302a to receive a mounting fastener, e.g., nut and bolt, rivets, etc., used to secure the lug 100 and bonding washer 50 to the mounting portion 302. The metal portion or the electrically conductive portion 302c of the mounting portion 302 of the structure 300 is covered by a non-conductive coating 302b.

To secure the lug 100 and the bonding washer 50 to the mounting portion 302 of the structure 300, a bolt 406 is passed through the aperture 302a in the mounting portion 302, through the aperture 54 in the body 52 of the bonding washer 50, and through the aperture 100a in the lug 100. A nut 400 is then attached to the bolt 406 and tightened to secure the lug 100 and the bonding washer 50 to the mounting portion 302 of the structure 300, as shown in FIG. 22. In an exemplary embodiment, a first washer 402, e.g., a flat washer, and/or a second washer 404, e.g., a lock washer, can be placed between the nut 400 and the lug 100 to provide a better connection between the lug 100 and the structure 300. As shown in FIG. 23, when the nut 400 and bolt 406 are tightened, each piercing member 56 cuts through or pierces the non-conductive coating 302b on the outer surface of the mounting portion 302 so that an electrically conductive path is established between the conductive metal 302c of the mounting portion 302 of the structure 300 and the bonding washer 50. As a result, an electrically conductive path is also established between the conductive metal 302c of the mounting portion 302 and the lug 100 such that current may flow from the structure 300 through the bonding washer 50, through the lug 100 to the conductor 200.

As noted above, when tightening the nut 400 to the bolt 406, an edge of the lug 100 may contact the extending member 58 of the bonding washer 50 which then limits or possibly prevents the lug 100 and/or bonding washer 50 from rotating relative to the structure 300 so as to ensure that the piercing members 56 pierce or cut through the coating 302b on the structure 300 to establish or create a sufficient electrically conductive path between the wire termination 100, here the lug, and the structure 300. As discussed previously, the piercing members 56 may also limit and possibly prevent rotation of the bonding washer 50 relative to the mounting portion 302 of the structure 300. More specifically, as the piercing members 56 cut through or pierce the non-conductive coating 302b on the outer surface of the mounting portion 302, the piercing members 56 partially or entirely burrow into the conductive metal 302c causing the bonding washer 50 to be fixed in position relative to the structure 300 so as to limit or possibly prevent rotation of the bonding washer 50 relative to the mounting portion 302 of the structure 300.

Figure 24:
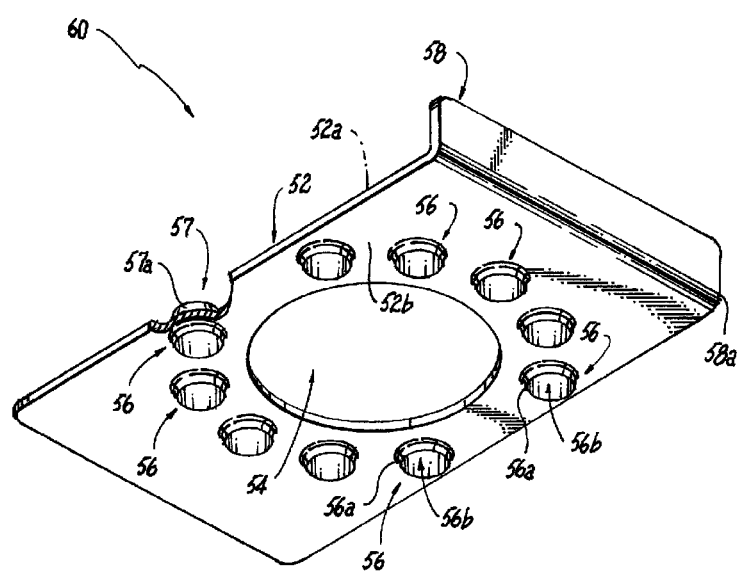
FIG. 24 is a bottom perspective view of another exemplary embodiment of a bonding washer according to the present disclosure, illustrating one or more piercing members extending from a first surface of the bonding washer and one or more gripping members extending from a second surface of the bonding washer.
Figure 25:
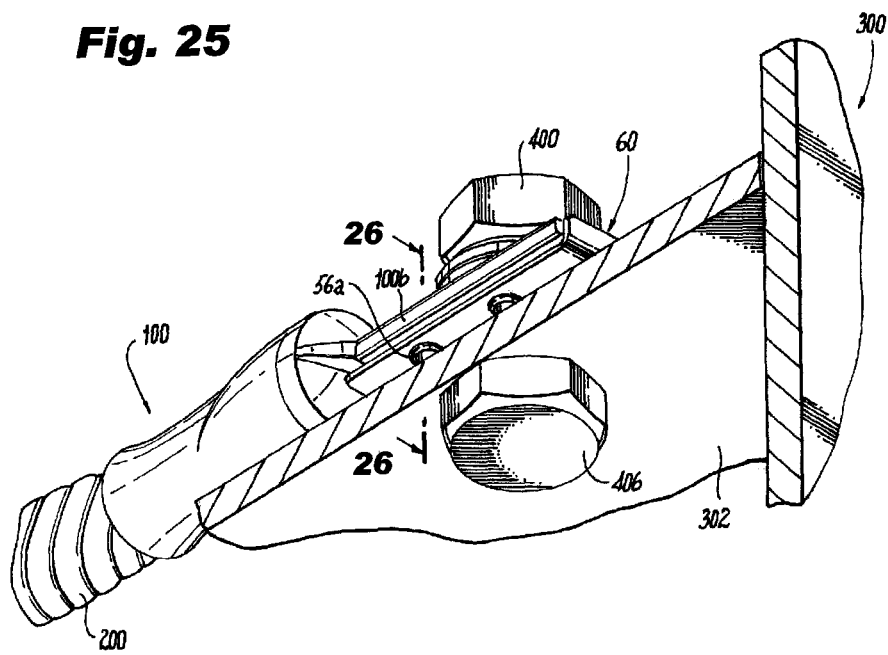
FIG. 25 is a bottom perspective view of the bonding washer of FIG. 24 and a wire termination connected to a metal structure having an outer surface coated with a non-conductive material.
Figure 26:
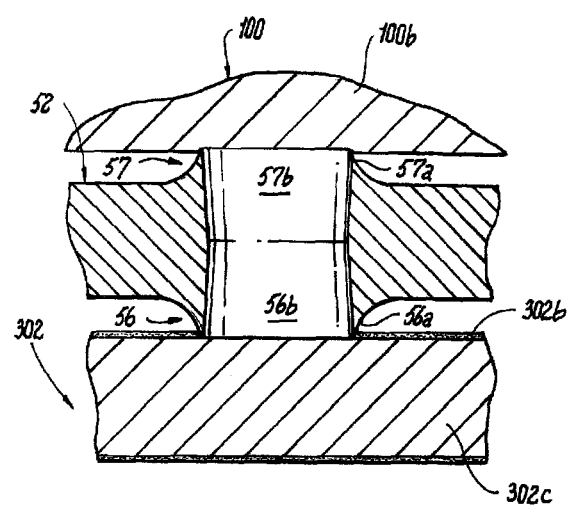
FIG. 26 is a partial cross-sectional view of the of the wire termination, bonding washer and metal structure of FIG. 25 taken along line 26-26, illustrating a piercing member piercing the non-conductive coating on the metal structure and a gripping member engaging the wire termination.

Referring now to FIGS. 24-26, another exemplary embodiment of a bonding washer according to the present disclosure is shown. In this exemplary embodiment, the bonding washer 60 is substantially the same as the bonding washer 50 described above, except that gripping members are added to the top surface 52a of the body 52 as described below. More specifically, the body portion 52 includes one or more gripping members 57 extending from the top surface 52a. Each gripping member 57 is capable of cutting into or burrowing into the wire termination 100 to limit or possibly prevent the wire termination 100 and/or the bonding washer 60 from rotating relative to the structure 300 so as to ensure that the piercing members 56 pierce or cut through the coating on the structure 300 to establish or create a sufficient electrically conductive path between the wire termination 100 and the structure 300 to facilitate electrically bonding the structure 300. Each gripping member 57 may also pierce through any non-conductive coatings on the wire termination 100 similar to how the piercing members 56 pierce through the non-conductive coatings 302b on the structure 300. Each gripping member 57 can be a unitary circular or other shaped tooth or structure, seen for example in FIGS. 24 and 26, that is capable of capable of cutting into or burrowing into the wire termination 100, and cutting through or piercing the non-conductive coating on the wire termination 100. In another exemplary embodiment, each gripping member 57 can be a unitary circular or other shaped tooth 57a or structure having a serrated distal edge, similar to the distal edge 17 seen in FIG. 6, that is also capable of capable of cutting into or burrowing into the wire termination 100 and cutting through or piercing the non-conductive coating on the wire termination 100. The gripping members 57 can be extruded from the body 52, or the gripping members 57 can be secured to the body 52 by for example a welded joint. It is noted that in the embodiment shown, the apertures 56b of the piercing members 56 are aligned with respective apertures 57b of the gripping members 57. However, one skilled in the art would readily appreciate that the apertures 56b of the piercing members 56 may not be aligned with the apertures 57b of the gripping members 57. In the exemplary embodiment shown, the gripping members 57 are disposed around the aperture 54 in the body 52. However, the gripping members 57 may be disposed, placed or arranged on the body 52 in any position suitable to burrow into the wire termination 100, e.g., lug and limit and possibly prevent rotational movement of the wire termination 100 and/or bonding washer 60 relative to the structure.

Referring to FIGS. 25 and 26, connecting the bonding washer 60 of the present disclosure to a wire termination 100 and structure 300 to establish an electrically conductive path therebetween is similar to that described above for bonding washer 50 and for ease of description is not repeated. However, in this exemplary embodiment, when the nut 400 and bolt 406 are tightened, each gripping member 57 cuts into or burrows into the blade portion 100b of the lug 100 to limit or possibly prevent the wire termination, e.g., the lug 100, and/or the bonding washer 60 from rotating relative to the structure 300 so as to ensure that the piercing members 56 pierce or cut through the coating 302b on the mounting portion 302 of the structure 300 to establish or create a sufficient electrically conductive path between the wire termination 100 and the structure 300 to facilitate electrically bonding the structure 300.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:
1. A bonding washer comprising:
 a first body portion having a bottom surface, a fastener receiving portion for receiving a mounting fastener, at least one piercing member, and at least one extended member, the at least one piercing member having a proximal edge integral with the first body portion and at least one raised surface ending in a distal edge, and the at least one extended member extends from the first body portion in a direction opposite the at least one piercing member; and a second body portion joined to the first body portion at a foldable joint, the second body portion having a bottom surface, a fastener receiving portion for receiving the mounting fastener, and at least one gripping member integral with the second body portion and extending from the bottom surface of the second body portion.

2. The bonding washer according to claim 1, wherein the first and second body portions are substantially planar.

3. The bonding washer according to claim 1, wherein the at least one extended member extends from one end of the first body portion.

4. The bonding washer according to claim 1, wherein the at least one extended member is configured to prevent rotation of a wire termination relative to a structure when securing the wire termination and bonding washer to the structure.

5. The bonding washer according to claim 1, wherein the at least one piercing member comprises a single tooth.

6. The bonding washer according to claim 1, wherein the at least one piercing member comprises a single tooth having a serrated distal end.

7. The bonding washer according to claim 1, wherein the fastener receiving portion of the first body portion comprises an aperture, and the fastener receiving portion of the second body portion comprises an aperture.

8. The bonding washer according to claim 1, wherein the foldable joint is positioned between the first and second body portions so that when the second body portion is folded relative to the first body portion, the fastener receiving portion of the first body portion is aligned with the fastener receiving portion of the second body portion.

9. A bonding washer comprising:
a first body portion having a bottom surface, a fastener receiving portion for receiving a mounting fastener, a plurality of piercing members and at least one extended member, wherein each of the plurality of piercing members has a proximal edge integral with the first body portion and at least one raised surface ending in a distal edge, and wherein the at least one extended member extends from the first body portion in a direction opposite the plurality of piercing members; and
a second body portion joined to the first body portion at a foldable joint, the second body portion having a bottom surface, a fastener receiving portion for receiving the mounting fastener, and a plurality of gripping members, wherein each of the plurality of gripping members is integral with the second body portion and extends from the bottom surface of the second body portion.

10. The bonding washer according to claim 9, wherein the first and second body portions are substantially planar.

11. The bonding washer according to claim 9, wherein the at least one extended member extends from one end of the first body portion.

12. The bonding washer according to claim 9, wherein the at least one extended member is configured to prevent rotation of a wire termination relative to a structure when securing the wire termination and bonding washer to the structure.

13. The bonding washer according to claim 9, wherein each of the plurality of piercing members comprises a single tooth.

14. The bonding washer according to claim 9, wherein each of the plurality of piercing members comprises a single tooth having a serrated distal end.

15. The bonding washer according to claim 9, wherein the fastener receiving portion of the first body portion comprises an aperture, and the fastener receiving portion of the second body portion comprises an aperture.

16. The bonding washer according to claim 9, wherein the foldable joint is positioned between the first and second body portions so that when the second body portion is folded relative to the first body portion, the fastener receiving portion of the first body portion is aligned with the fastener receiving portion of the second body portion.

17. A bonding washer comprising:
a first body portion having a bottom surface, a fastener receiving aperture for receiving a mounting fastener and at least one piercing member having a proximal edge integral with the first body portion and at least one raised surface ending in a distal edge, and
a second body portion joined to the first body portion at a foldable joint, the second body portion having a bottom surface, a fastener receiving aperture for receiving the mounting fastener and at least one gripping member integral with the second body portion and extending from the bottom surface of the second body portion.

18. The bonding washer according to claim 17, wherein the first and second body portions are substantially planar.

19. The bonding washer according to claim 17, wherein the at least one piercing member comprises a single tooth.

20. The bonding washer according to claim 17, wherein the at least one piercing member comprises a single tooth having a serrated distal end.

21. The bonding washer according to claim 17, wherein the foldable joint is positioned between the first and second body portions so that when the second body portion is folded relative to the first body portion, the fastener receiving portion of the first body portion is aligned with the fastener receiving portion of the second body portion.

* * * * *